(12) United States Patent
Umeda

(10) Patent No.: US 8,331,905 B2
(45) Date of Patent: Dec. 11, 2012

(54) COMMUNICATIONS TERMINAL DEVICE

(75) Inventor: Yoshio Umeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 672 days.

(21) Appl. No.: 12/518,830

(22) PCT Filed: Sep. 26, 2007

(86) PCT No.: PCT/JP2007/068620
§ 371 (c)(1),
(2), (4) Date: Jun. 11, 2009

(87) PCT Pub. No.: WO2008/072404
PCT Pub. Date: Jun. 19, 2008

(65) Prior Publication Data
US 2010/0008486 A1  Jan. 14, 2010

(30) Foreign Application Priority Data

Dec. 12, 2006  (JP) ................................. 2006-333981

(51) Int. Cl.
*H04M 1/66* (2006.01)
(52) U.S. Cl. .................... 455/410; 455/567; 379/201.11
(58) Field of Classification Search .......... 455/566–567, 455/410; 379/142.17, 201.11
See application file for complete search history.

(56) References Cited

U.S. PATENT DOCUMENTS

| | | | | |
|---|---|---|---|---|
| 6,366,659 B1 * | 4/2002 | Koponen et al. | ......... | 379/207.15 |
| 7,376,705 B2 * | 5/2008 | Nagai et al. | .................. | 709/206 |
| 7,620,385 B2 * | 11/2009 | Tsampalis et al. | ............ | 455/410 |
| 2006/0172779 A1 * | 8/2006 | Yoshida | ........................ | 455/567 |
| 2007/0268789 A1 * | 11/2007 | Takamune | ................. | 369/29.02 |
| 2008/0096590 A1 * | 4/2008 | Celik et al. | ..................... | 455/466 |

FOREIGN PATENT DOCUMENTS

| | | | |
|---|---|---|---|
| JP | 9-153946 A | | 6/1997 |
| JP | 10-276259 A | | 10/1998 |
| JP | 11-355417 A | | 12/1999 |
| JP | 2000196732 A | * | 7/2000 |
| JP | 2001-345926 A | | 12/2001 |
| JP | 2002-135396 A | | 5/2002 |
| JP | 2003-32353 A | | 1/2003 |
| JP | 2004-178179 A | | 6/2004 |
| JP | 2005-198170 A | | 7/2005 |
| JP | 2005198170 A | * | 7/2005 |

* cited by examiner

*Primary Examiner* — Yuwen Pan
*Assistant Examiner* — Assad Mohammed
(74) *Attorney, Agent, or Firm* — Birch, Stewart, Kolasch & Birch, LLP

(57) ABSTRACT

A communication terminal device is provided with a communication unit; a memory unit that stores a telephone directory data having at least names, telephone numbers and display control information, a display unit that displays the information; and a control unit that carries out communication display prohibition control to prohibit the display unit from displaying a predetermined telephone number in the case where the display control information corresponding to such a predetermined telephone number is set to display prohibition when the communication unit communicates with a party with the telephone number. Thus, the communication terminal device cannot only keep secrecy more securely but also it can be a communication terminal device with which an easily useful telephone directory is provided.

4 Claims, 6 Drawing Sheets

COMMUNICATIONS TERMINAL DEVICE

BACKGROUND OF THE INVENTION

1. Field of the Invention

The present invention relates to, for example, a communications terminal device such as a cellular phone, and more particularly to a communication terminal device capable of effectively preventing leakage of personal information.

2. Description of the Related Art

Conventionally, in a cellular phone, phone directory data containing names and phone numbers is created by a user and, when a call is originated or received, the phone number of the call's destination or origin as registered in the phone directory data is displayed on the display. When a name registered in the phone directory data is inputted, the corresponding phone number is displayed on the display.

As cellular phones provided with such phone directory data, there have been proposed those which permit secret numbers to be set entry-by-entry for phone directory data, thereby to allow security protection of the phone directory data (see, for example, Patent Document 1 listed below).

Patent Document 1: JP-A-2001-345926

SUMMARY OF THE INVENTION

Problems to be Solved by the Invention

Inconveniently, however, with the conventional cellular phones mentioned above, once a secret number is inputted to enable use of a security-protected entry in phone directory data, when, for example, a call is originated, a phone number of which the security should be protected is displayed on the display. Since a phone number displayed on the display is easily visible to anyone else, the security of the phone number—personal information—is no longer protected adequately. Moreover, a secret number needs to be inputted every time phone directory data is viewed or retrieved. This makes phone directory data troublesome to use.

It is therefore an object of the present invention to provide a communications terminal device that allows surer security protection and that in addition is provided with easy-to-use phone directory data.

Means for Solving the Problem

To achieve the above object, according to the invention, a communications terminal device is provided with: a communication portion that performs communication; a storage portion that stores phone directory data including at least a name, a phone number, and display control information; a display portion that displays information; and a control portion that performs communication display inhibition control if, when the communication portion communicates with a partner of a predetermined phone number, the display control information corresponding to this phone number is set for "inhibited," so as to inhibit display of this phone number on the display portion.

With this configuration, when communication is performed with a partner of a phone number for which the display control information is set for "inhibited," the phone number is prevented from being displayed on the display portion. Thus, it is possible to prevent the inconvenience of the phone number displayed on the display portion being viewed by someone else, and it is possible to adequately protect the security of the phone number, which is personal information.

Moreover, so long as the display control information of the phone directory data is previously set for "inhibited," without the need to input a secret number every time the phone directory data is used, the control portion prevents display of the phone number on the display portion. Thus, it is possible to realize a communications terminal device that allows effective security protection and that in addition is provided with easy-to-use phone directory data.

In the configuration described above, the control portion may perform the communication display inhibition control when the communication portion originates a call to the predetermined phone number.

With this configuration, when a call is originated to a partner of a phone number for which the display control information is set for "inhibited," the phone number is prevented from being displayed on the display portion. Thus, it is possible to prevent the inconvenience of personal information of the communication partner leaking at the time of call origination.

In the configuration described above, the control portion may perform the communication display inhibition control when the communication portion receives a call from the predetermined phone number.

With this configuration, when a call is received from a partner of a phone number for which the display control information is set for "inhibited," the phone number is prevented from being displayed on the display portion. Thus, it is possible to prevent the inconvenience of personal information of the communication partner leaking at the time of call reception.

In the configuration described above, when the communication display inhibition control is performed, substitute information indicating that no phone number will be displayed may be displayed on the display portion.

With this configuration, displaying substitute information on the display portion makes it possible to notify that the display control information for the communication partner is set for "inhibited." Here, the substitute information preferably includes, for example, identifying information that, by means of a registration number, image, symbol, or the like, enables the user to identify the communication partner. This permits the user alone, and no one else, to identify the communication partner, and thus allows higher security protection. The identifying information may be information other than a registration number, image, or symbol; it has simply to be information that is associated with the communication partner and by which only the user, and hence no one else, can identify the communication partner.

In the configuration described above, there may be further provided an editing portion that edits the contents of the phone directory data so that, when the contents of the phone directory data is edited by the editing portion, if the display control information of this phone directory data is set for "inhibited," the control portion may inhibit display of the phone number of this phone directory data on the display portion.

With this configuration, when the contents of phone directory data for which the display control information is set for "inhibited" is edited, the phone number of this phone directory data is prevented from being displayed on the display portion. Thus, it is possible to prevent the inconvenience of the phone number displayed on the display portion being viewed by someone else at the time of phone directory data editing, and thus it is possible to protect the security of personal information.

In the configuration described above, when the contents of the phone directory data is edited by the editing portion, if the display control information of this phone directory data is set for "inhibited," the control portion may inhibit modification of the phone number of this phone directory data.

With this configuration, when the contents of phone directory data for which the display control information is set for "inhibited" is edited, the phone number of this phone directory data is prevented from being modified. Thus, it is possible to prevent falsification of personal information.

In the configuration described above, when the contents of the phone directory data is edited by the editing portion, if the display control information of this phone directory data is set for "inhibited," the control portion may inhibit the editing from ending with the name of the phone directory data blank.

With this configuration, when the contents of phone directory data for which the display control information is set for "inhibited" is edited, information of a name is surely written to the phone directory data. Thus, it is possible to prevent the inconvenience of neither a phone number nor a name being displayed and hence the communication partner being unable to be identified at the time of communication or the like.

In the configuration described above, when the contents of the phone directory data is edited by the editing portion, if the display control information of this phone directory data is set for "inhibited," as the phone number of this phone directory data is modified, the control portion may create new phone directory data, and if the display control information of this new phone directory data is set for "inhibited," the control portion may inhibit the editing from ending with the name of this new phone directory data blank.

With this configuration, when the contents of phone directory data for which the display control information is set for "inhibited" is edited, if the phone number is modified, new phone directory data is created. Thus, it is possible to prevent falsification of personal information. Furthermore, if the display control information for the new phone directory data is set for "inhibited," information of a name is surely written to the phone directory data. Thus, it is possible to prevent the inconvenience of neither a phone number nor a name being displayed and hence the communication partner being unable to be identified at the time of communication or the like.

In the configuration described above, there may be further provided an editing portion that edits the contents of the phone directory data, a secret number storage portion that stores a secret number, and a secret number input portion to which a secret number is inputted, so that, when a request that the display control information of the phone directory data be modified by the editing portion is received, the control portion may prompt input of a secret number to the secret number input portion and, if the secret number inputted to the secret number input portion does not match the secret number previously stored in the secret number storage portion, the control portion may inhibit modification of the display control information.

With this configuration, when the display control information is set for "inhibited," leakage of personal information is prevented at the time of communication or the like, and the display control information is protected by means of a secret number. Thus, it is possible, without the need to input a secret number every time communication or the like is performed, to protect personal information with less trouble.

In the configuration described above, there may be further provided an output portion that outputs the contents of the phone directory data to outside, and the phone directory data may further include output control information, so that, if the output control information is set for "inhibited," the control portion may inhibit output of the contents of the phone directory data to outside by the output portion.

With this configuration, by previously setting the output control information of the phone directory data for "inhibited," it is possible to prevent the inconvenience of the contents of the phone directory data being leaked to outside by the output portion. Thus, it is possible to achieve security protection without use of a secret number as conventionally practiced and hence without loss in ease of use.

In the configuration described above, there may be further provided: a self-data storage portion in which self data including at least a name and a phone number of a user is stored; a self-phone-directory-data creation portion that adds display control information to the self data stored in the self-data storage portion and sets this display control information for "inhibited" to create self phone directory data; and a self-data output portion that outputs the contents of the self phone directory data to outside.

With this configuration, by making the self-data output portion output the self phone directory data to, for example, another communications terminal device, it is possible to transfer self information to the other communications terminal device. Here, since the self-phone-directory-data creation portion can previously set the display control information for "inhibited," it is possible to prevent the self phone number from being displayed on the display portion on the output destination, i.e., the other communications terminal device, at the time of communication or the like. Thus, it is possible, on the other communications terminal device, to protect the security of self-related information. The output destination of the self phone directory data may be any device other than a communications terminal device so long as it can control its display portion based on display control information.

In the configuration described above, there may be further provided: a self-data storage portion in which self data including at least a name and a phone number of a user is stored; a self-phone-directory-data creation portion that adds output control information to the self data stored in the self-data storage portion and sets this output control information for "inhibited" to create self phone directory data; and a self-data output portion that outputs the contents of the self phone directory data to outside.

With this configuration, by making the self-data output portion output the self phone directory data to, for example, another communications terminal device, it is possible to transfer self information to the other communications terminal device. Here, since the self-phone-directory-data creation portion can previously set the output control information for "inhibited," it is possible to prevent self-related phone directory data from being outputted to yet another communications terminal device or the like. Thus, it is possible, on the other communications terminal device, to protect the security of self-related information. The output destination of the self phone directory data may be any device other than a communications terminal device so long as it can control its display portion based on display control information.

Advantages of the Invention

With a communications terminal device according to the invention, when the communication portion communicates with a partner of a predetermined phone number, if the display control information of the phone directory data corresponding to that phone number is set for "inhibited," the control portion inhibits display of that phone number on the display portion. Thus, it is possible to prevent the inconvenience of the phone number displayed on the display portion being viewed by someone else, and it is possible to adequately protect the security of the phone number, which is personal information.

Moreover, so long as the display control information of the phone directory data is previously set for "inhibited," without the need to input a secret number every time the phone directory data is used, the control portion prevents display of the phone number on the display portion. Thus, it is possible to realize a communications terminal device that allows effective security protection and that in addition is provided with easy-to-use phone directory data.

LIST OF REFERENCE SYMBOLS

Figure 1:
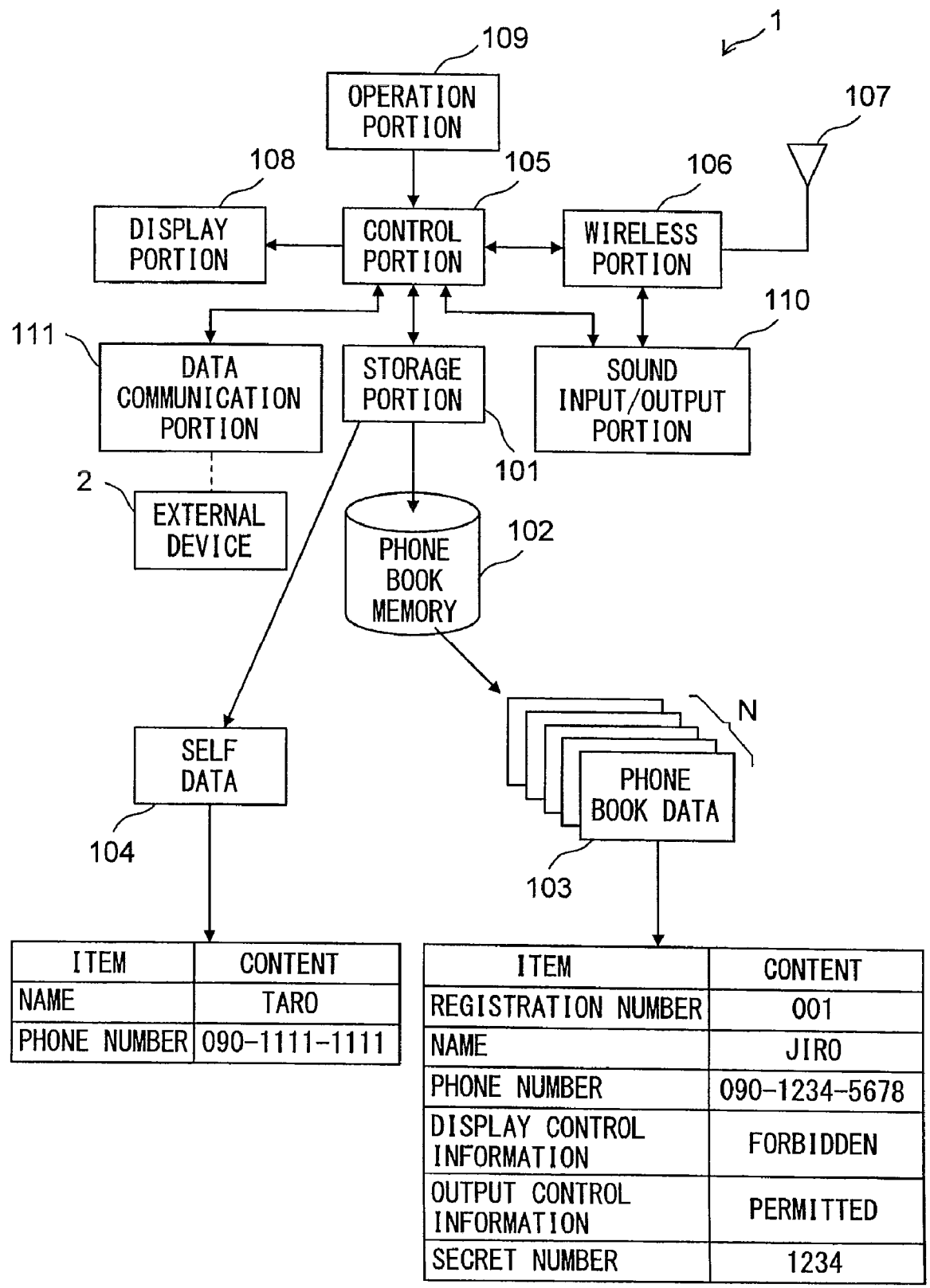
FIG. 1 A schematic diagram showing a cellular phone as a communications terminal device embodying the invention.

1 Cellular phone
2 External device
101 Storage portion
102 Phone book memory
103 Phone directory data
104 Self data
105 Control portion
106 Wireless portion
107 Antenna
108 Display portion
109 Operation portion
110 Sound input/output portion
111 Data communication portion

DETAILED DESCRIPTION OF THE INVENTION

A communications terminal device embodying the invention will be described in detail below with reference to the accompanying drawings.

FIG. 1 is a schematic diagram showing a cellular phone 1 as a communications terminal device embodying the invention. The cellular phone 1 is provided with the following: a storage portion 101 formed with RAM (random-access memory) or flash ROM (read-only memory); a control portion 105 formed with a microprocessor; a wireless portion 106 that communicates wirelessly; an antenna 107; a display portion 108 formed with a liquid crystal display device or the like; an operation portion 109 operated by the user for input of various kinds of information and instructions; and a sound input/output portion 110 that handles input and output of sound mainly during a call. The cellular phone 1 is further provided with a data communication portion 111 that communicates phone directory data via wired connection using a serial cable or the like or via wireless connection using infrared rays or the like. Via the data communication portion 111, the cellular phone 1 is connected to an external device 2. The data communication portion 111 functions as an output portion and a self-data output portion according to the invention. The external device 2 is, for example, a cellular phone, a personal computer, or the like, and may be any device so long as it can perform processing based on display control information and output control information of phone directory data 103 outputted from the cellular phone 1.

In the storage portion 101, there is provided a phone directory memory 102 for storage of phone directory data 103. The phone directory data 103 stored in the phone directory memory 102 contains registration numbers, names, phone numbers, display control information, output control information, and secret numbers. The region of the phone directory data 103 where secret numbers are stored functions as a secret number storage portion. In the storage portion 101, there is secured a self-data region for storage of self data 104. The self data 104 is composed of the name and phone number of the user. The self-data region in the storage portion 101 functions as a self-data storage portion according to the invention. A control circuit for the storage portion 101 functions as an editing portion according to the invention.

In the storage portion 101, there is stored a control program that is executed by the control portion 105; according to this program, the control portion 105 controls the relevant portions so that the cellular phone 1 operates in the desired manner. Now, the operations executed under the control of the control portion 105 will be described with reference to flow charts.

Figure 2:
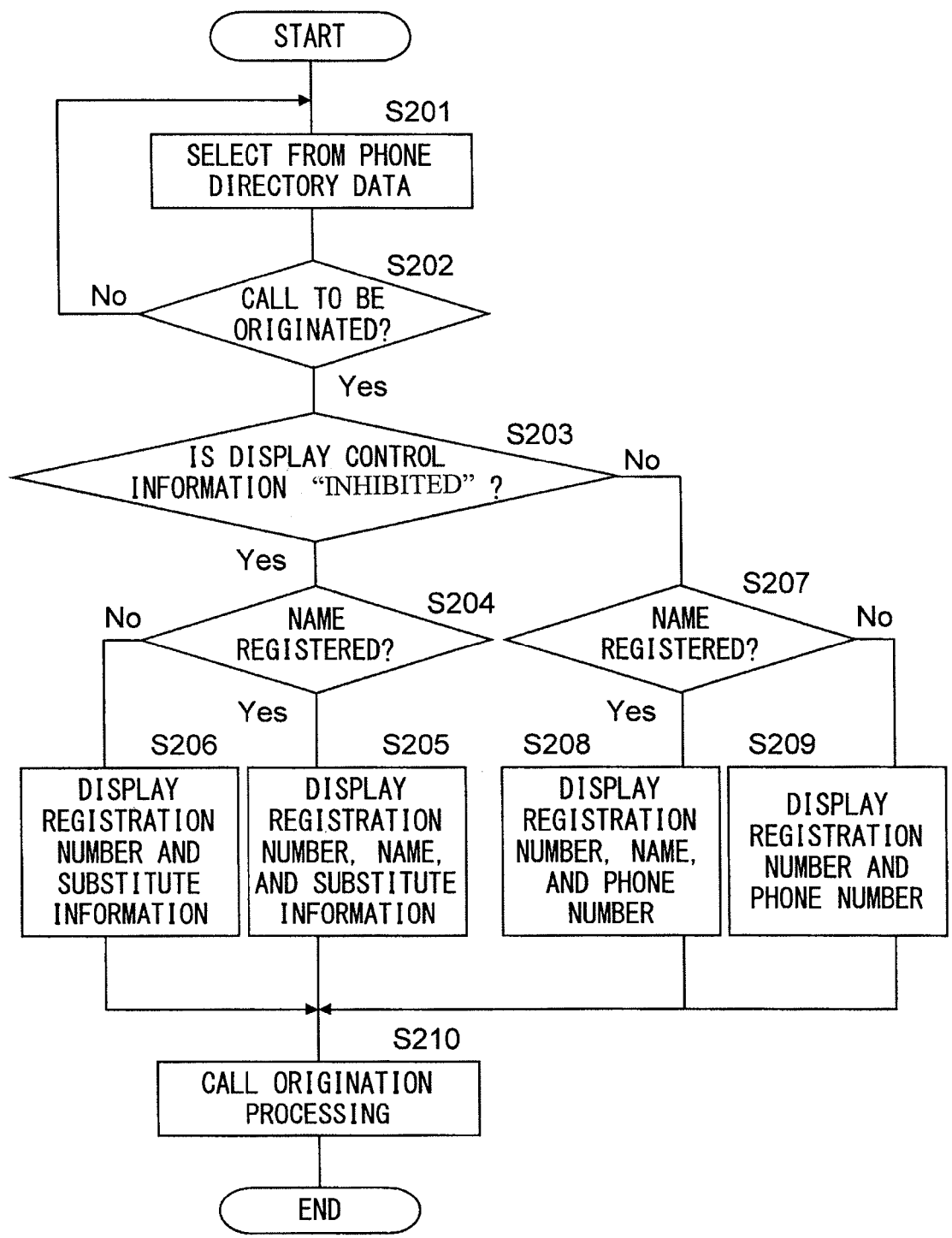
FIG. 2 A flow chart showing the processing executed when the cellular phone originates a call.

FIG. 2 is a flow chart showing the processing executed when the cellular phone 1 of the embodiment originates a call by use of phone directory data.

First, based on input by the operator on the operation portion 109, predetermined phone directory data 103 is selected (step S201), and whether or not a call is going to be originated by use of the phone directory data 103 is checked (step S202). If subsequent input by the operator does not request call origination, a return is made to step S201 for selection of phone directory data 103. If subsequent input by the operator requests call origination, then whether or not the display control information of the phone directory data 103 is set for "inhibited" is checked (step S203). If the display control information is set for "inhibited," whether or not a name is registered in the phone directory data 103 is checked (step S204). If a name is registered in the phone directory data 103, the registration number and name are, accompanied by substitute information instead of the phone number, displayed on the display portion 108 (step S205). As the substitute information here, it is possible to use, for example, a character string obtained by replacing every numeral in the phone number with an asterisk (*). The name displayed on the display portion 108 may also be substituted for by substitute information containing identifying information formed with a symbol or image by which only the user can identify the communication partner. Displaying substitute information containing identifying information there helps protect the security of not only the phone number but also the name. After the display of the substitute information, the wireless portion 106 performs call origination processing (step S210).

If, in step S204 mentioned above, no name is registered in the phone directory data 103, the registration number is, accompanied by substitute information instead of the phone number, displayed on the display portion 108 (step S206), and call origination processing is performed (step S210).

If, in step S203 mentioned above, the display control information is not set for "inhibited," whether or not a name is registered in the phone directory data 103 (step S207) is checked; if a name is registered in the phone directory data 103, the registration number, name, and phone number are displayed on the display portion 108 (step S209), and call origination processing is performed (step S210).

If, in step S207 mentioned above, no name is registered in the phone directory data 103, the registration number and phone number are displayed on the display portion 108 (step S209), and call origination processing is performed (step S210).

As described above, when the cellular phone 1 originates a call by use of the phone directory data 103, if the display control information of the phone directory data 103 is set for "inhibited," the cellular phone 1 can so control that the phone number is not displayed on the display portion 108. This makes it possible to prevent the inconvenience of, when the cellular phone 1 originates a call, the display portion 108 being viewed by someone else and hence a phone number—personal information—leaking to someone else.

Figure 3:
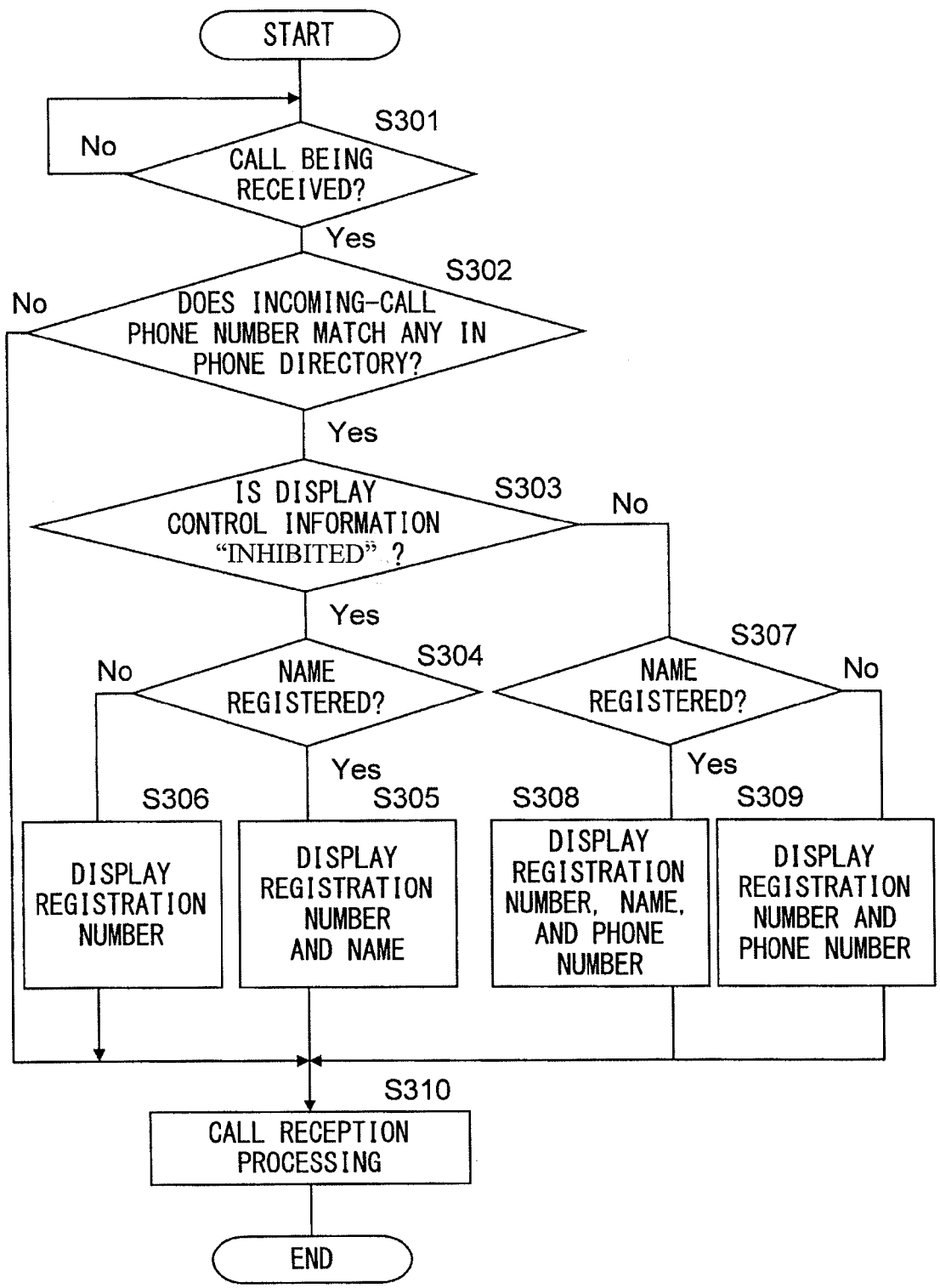
FIG. 3 A flow chart showing the processing executed when the cellular phone receives a call.

FIG. 3 is a flow chart showing the processing executed when the cellular phone 1 of the embodiment receives a call.

First, whether or not the wireless portion 106 is receiving a call is checked (step S301); if it is not receiving a call, the check for call reception is repeated.

If it is found that the wireless portion 106 is receiving a call, the incoming-call phone number detected by the wireless portion 106 is compared with the phone numbers in the phone directory data 103 stored in the phone book memory 102 (step S302). If there is no phone number in the phone directory data 103 which matches the incoming-call phone number, the wireless portion 106 performs call reception processing (step S310).

If, in step S302 mentioned above, there is a phone number in the phone directory data 103 which matches the incoming-call phone number, whether or not the display control information of the phone directory data 103 is set for "inhibited" is checked (step S303); if the display control information is set for "inhibited," whether or not a name is registered in the phone directory data 103 is checked (step S304). If a name is registered in the phone directory data 103, the registration number and name of the calling partner are displayed on the display portion 108 (step S305), and the wireless portion 106 performs call reception processing (step S310).

If, in step S304 mentioned above, no name is registered in the phone directory data 103, the registration number is displayed on the display portion 108 (step S306), and the wireless portion 106 performs call reception processing (step S310).

If, in step S303 mentioned above, the display control information of the phone directory data 103 is set for "permitted," whether or not a name is registered in the phone directory data 103 is checked (step S307); if a name is registered, the registration number, name, and phone number are displayed on the display portion 108 (step S308), and the wireless portion 106 performs call reception processing (step S310).

If, in step S307 mentioned above, no name is registered in the phone directory data 103, the registration number and phone number are displayed on the display portion 108 (step S309), and the wireless portion 106 performs call reception processing (step S310).

As described above, when the cellular phone 1 receives a call, if the display control information of the phone directory data 103 corresponding to the communication partner's phone number is set for "inhibited," the cellular phone 1 can so control that the phone number is not displayed on the display portion 108. This makes it possible to prevent the inconvenience of, when the cellular phone 1 receives a call, the display portion 108 being viewed by someone else and hence a phone number—personal information—leaking to someone else.

Figure 4:
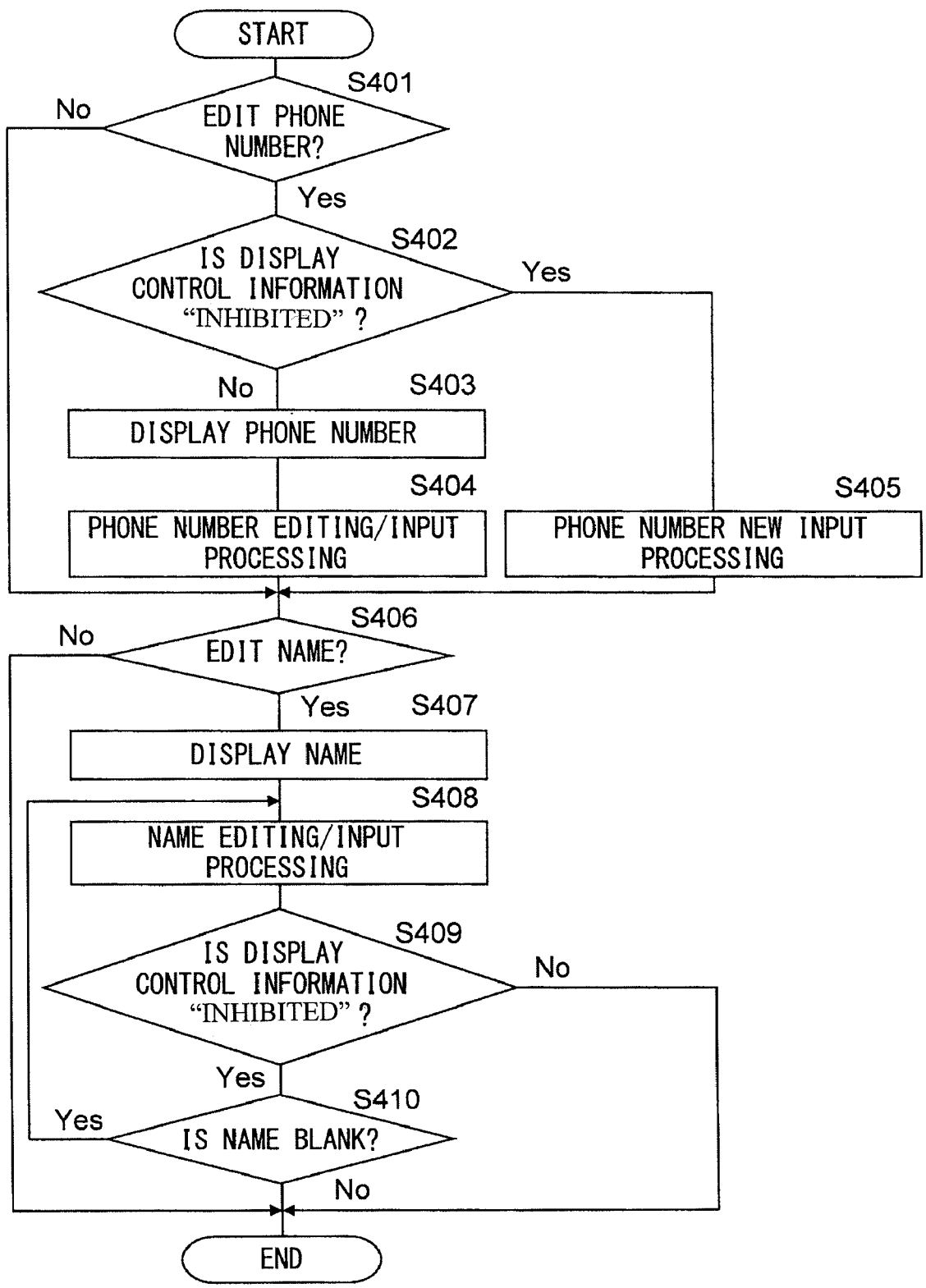
FIG. 4 A flow chart showing the processing executed when phone directory data is edited.

FIG. 4 is a flow chart showing the processing executed in the cellular phone 1 of the embodiment when the phone directory data 103 stored in the phone book memory 102 is edited.

First, based on input by the operator on the operation portion 109, editing of the phone directory data 103 is started; during the editing, whether or not there is a request to the operation portion 109 for editing of the phone number is checked (step S401). If there is no request for editing of the phone number, an advance is made to step S406, which will be described later.

If, in step S401 mentioned above, editing of the phone number is requested, whether or not the display control information of the phone directory data 103 is set for "inhibited" is checked (step S402); if the display control information is set for "inhibited," new input processing is performed to prompt the operator to input a phone number newly (step S405). In the new input processing here, the display control information may simultaneously be set for "permitted."

If, in step S402 mentioned above, the display control information is set for "permitted," the phone number of the phone directory data 103 is displayed on the display portion 108 (step S403); subsequently phone number editing/input processing is performed to accept editing/input of the phone number (step S404), and then an advance is made to step S406.

In step S406, whether or not there is a request to the operation portion 109 for editing of the name is checked; if there is no request for editing of the name, the flow terminates.

If, in step S406, there is a request for editing of the name, the name is displayed on the display portion 108 (step S407). Then, name editing/input processing is performed to accept editing/input of the name (step S408). Then, whether or not the display control information of the phone directory data 103 is set for "inhibited" is checked (step S409); if the display control information is set for "permitted," the flow terminates.

If, in step S409 mentioned above, the display control information is set for "inhibited," whether or not the name is blank is checked (step S410); if it is blank, a return is made to name editing/input processing (step S408).

As described above, when the phone directory data 103 is edited, if the display control information of the phone directory data 103 is set for "inhibited," the phone number is prevented from being displayed on the display portion 108. Thus, it is possible to prevent leakage of a phone number—personal information—and protect its security. Moreover, when the name in the phone directory data 103 is edited, if the display control information of the phone directory data 103 is set for "inhibited," editing is prevented from ending with the name blank. Thus, it is possible to prevent the inconvenience of, during communication or the like, neither a phone number nor a name being displayed and hence the target of communication or the like being left unable to be identified.

Incidentally, when phone directory data is created by the new input processing mentioned above, whether or not to set the display control information for "permitted" or "inhibited" may be left freely selectable. If it is set for "inhibited" and in addition editing of the name is performed, editing has simply to be prevented from ending with the name blank.

Figure 5:
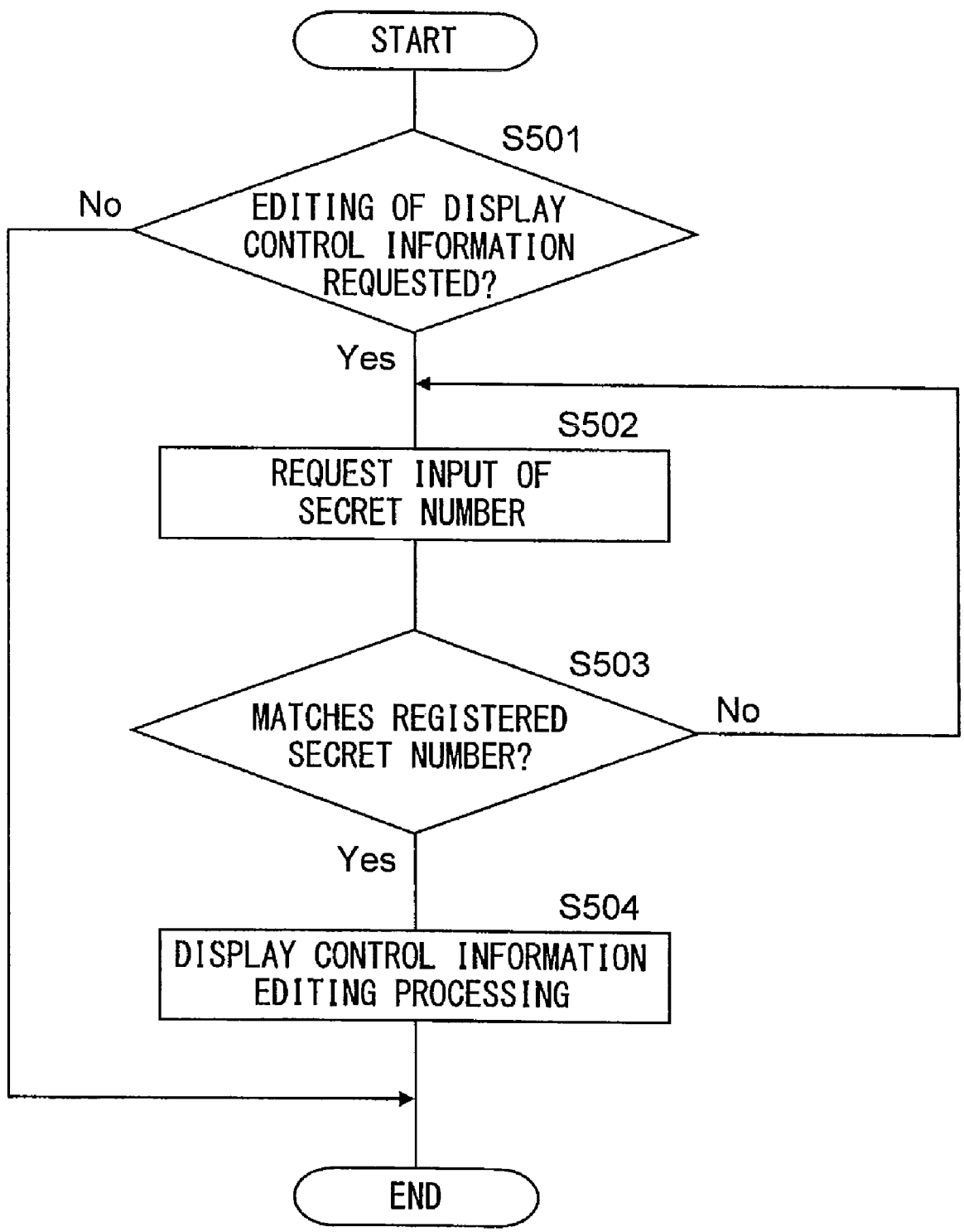
FIG. 5 A flow chart showing the processing executed when display control information in phone directory data is edited.

FIG. 5 is a flow chart showing the processing executed in the cellular phone 1 of the embodiment when, of the phone directory data 103 stored in the phone book memory 102, the display control information is edited.

First, based on input by the operator on the operation portion 109, whether or not, during editing of the phone directory data 103, there is a request for editing of the display control information is checked (step S501); if there is no request for editing, the flow terminates.

If, in step S501 mentioned above, there is a request for editing the display control information, a screen requesting input of the secret number is displayed on the display portion 108 (step S502). When the operator inputs the secret number on the operation portion 109, whether or not the secret number matches the secret number registered in the phone directory data 103 is checked (step S503). Here, the operation portion 109 functions as a secret number input portion. If the secret number inputted matches the secret number registered in the phone directory data 103, the display control information is edited based on input on the operation portion 109 (step S504). If, in step S503 mentioned above, the secret number inputted does not match the secret number registered, a return is made to the secret number input processing in step S502 mentioned above.

As described above, verification of the secret number is performed only during editing of the display control information, whereas during normal communication or during editing of the phone directory data 103, so long as the display control information is set for "inhibited," the secret number is prevented from being displayed on the display portion. Thus, it is possible, by simple operation, to prevent leakage of personal information.

Figure 6:
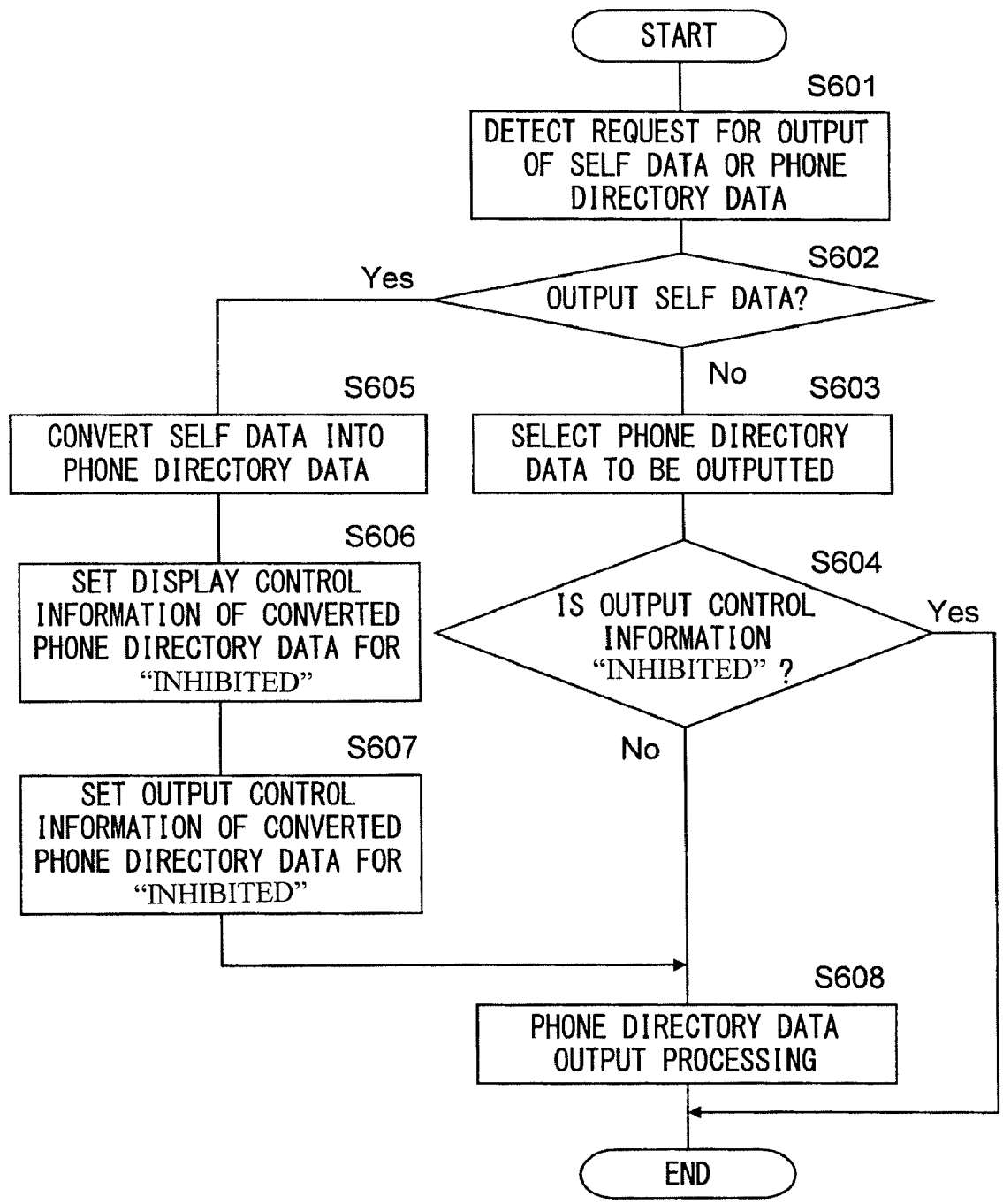
FIG. 6 A flow chart showing the processing performed when phone directory data and self data are outputted to an external device.

FIG. 6 is a flow chart showing the processing performed in the cellular phone 1 of the embodiment when the phone directory data 103 and the self data 104 are outputted to the external device 2.

First, when, based on input by the operator on the operation portion 109, a request for output of the phone directory data 103 or the self data 104 to outside is detected (step S601), whether what is requested to be outputted is the phone directory data 103 or the self data 104 is checked (step S602). If what is requested to be outputted is the phone directory data 103, input is accepted that specifies the phone directory data 103 to be outputted (step S603). The output control information of the specified phone directory data 103 is then checked (step S604) and, if the output control information is set for "inhibited," the flow terminates.

If, when the output control information of the specified phone directory data 103 is checked (step S604), the output control information is set for "permitted," output processing for the phone directory data 103 is performed, so that the phone directory data 103 is outputted via the data communication portion 111 to the external device 2 (step S608).

If, in step S602 mentioned above, what is requested to be outputted is the self data 104, processing for converting the self data 104 into the format of the phone directory data 103 is performed (step S605), the display control information of the converted phone directory data 103 is set for "inhibited" (step S606), the output control information of the converted phone directory data 103 is set for "inhibited" (step S607), and output processing for the phone directory data 103 is performed (step S608). Here, the control portion 105 functions as a self-phone-directory-data creation portion.

As described above, when the phone directory data 103 is outputted, by previously setting the output control information for "inhibited," it is possible to inhibited output of the phone directory data 103 and prevent leakage of information. On the other hand, when the self data 104 is outputted, it is outputted with the display control information set for "inhibited" and the output control information set for "inhibited." This makes it possible to prevent the inconvenience of self information leaking from the external device 2, to which it is outputted.

Although the embodiment described above deals with a case where the invention is applied to a cellular phone 1, the invention finds wide application in communications terminal devices of other types as well.

The invention claimed is:

1. A communications terminal device comprising:
a communication portion that performs communication;
a storage portion that stores phone directory data including at least a name, a phone number, and display control information;
a display portion that displays information;
an editing portion that edits contents of the phone directory data, and
a control portion that performs communication display inhibition control if, when the communication portion communicates with a partner of a predetermined phone number, the display control information corresponding to this phone number is set to a mode that inhibits display, so as to inhibit display of this phone number on the display portion,
wherein, when the contents of the phone directory data is edited by the editing portion, if the display control information of this phone directory data is set to the mode that inhibits display, the control portion inhibits display of the phone number of this phone directory data on the display portion,
wherein the communications terminal device further comprises:
an output portion that outputs contents of the phone directory data to an external device adapted to receive data from the communications terminal device,
wherein the phone directory data further includes output control information,
wherein, if the output control information is set to a mode that inhibits output of the phone directory data, the output portion inhibits the contents of the phone directory data from being output to the external device by the output portion, and
wherein the communications terminal device further comprises:
a self-data storage portion in which self data including at least a name and a phone number of a user of the communications terminal device is stored, the self data being stored in a region different from a region that stores the phone directory data;
a self-phone-directory-data creation portion that, in response to a request for output of the self data to the external device, creating self phone directory data by adding output control information to the self data stored in the self-data storage portion and setting this output control information to a mode that inhibits the self data from being at least one of displayed by the external device and output from the external device, and allowing the self data to be output to the external device; and
a self-data output portion that outputs contents of the self phone directory data to the external device.

2. The communications terminal device according to claim 1, wherein the control portion performs the communication display inhibition control when originating a call.

3. A communications terminal device comprising:
a communication portion that performs communication;
a storage portion that stores phone directory data including at least a name, a phone number, and display control information;
a display portion that displays information;
an editing portion that edits contents of the phone directory data; and a control portion that performs communication display inhibition control if, when the communication portion communicates with a partner of a predetermined phone number, the display control information corresponding to this phone number is set to a mode that inhibits display, so as to inhibit display of this phone number on the display portion, wherein, when the contents of the phone directory data is edited by the editing portion, if the display control information of this phone directory data is set to the mode that inhibits display, the control portion inhibits display of the phone number of this phone directory data on the display portion, and wherein the communications terminal device further comprises:

a self-data storage portion in which self data including at least a name and a phone number of a user of the communications terminal device is stored, the self data being stored in a region different from a region that stores the phone directory data;

a self-phone-directory-data creation portion that, in response to a request for output of the self data to an external device adapted to receive data from the communications terminal device, creating self phone directory data by adding display control information to the self data stored in the self-data storage portion and setting this display control information to a mode that inhibits the self data from being at least one of displayed by the external device and output from the external device, and allowing the self data to be output to the external device; and a self-data output portion that outputs contents of the self phone directory data to the external device.

4. The communications terminal device according to claim 3, wherein the control portion performs the communication display inhibition control when originating a call.

* * * * *